(12) United States Patent
Saraie et al.

(10) Patent No.: US 10,274,927 B2
(45) Date of Patent: Apr. 30, 2019

(54) METHOD OF MACHINING WORKPIECE USING MACHINE TOOL, AND MACHINE TOOL

(71) Applicant: DMG MORI CO., LTD., Nara (JP)

(72) Inventors: Hidenori Saraie, Nara (JP); Kinji Hashimoto, Nara (JP); Keiichiro Matsuo, Nara (JP); Kazuo Yamazaki, El Macero, CA (US); Toshiya Sato, Gifu (JP)

(73) Assignee: DMG MORI CO., LTD., Nara (JP)

(*) Notice: Subject to any disclaimer, the term of this patent is extended or adjusted under 35 U.S.C. 154(b) by 652 days.

(21) Appl. No.: 14/993,353

(22) Filed: Jan. 12, 2016

(65) Prior Publication Data
US 2016/0209828 A1    Jul. 21, 2016

(30) Foreign Application Priority Data
Jan. 16, 2015 (JP) .................................. 2015-006541

(51) Int. Cl.
  *G05B 19/402* (2006.01)
  *B23Q 17/22* (2006.01)
  *B23Q 23/00* (2006.01)

(52) U.S. Cl.
  CPC .. *G05B 19/402* (2013.01); *G05B 2219/34457* (2013.01); *G05B 2219/36584* (2013.01)

(58) Field of Classification Search
  CPC ........ G05B 19/402; G05B 2219/36584; G05B 2219/34457; B23Q 17/2233; B23Q 23/00
  See application file for complete search history.

(56) References Cited

U.S. PATENT DOCUMENTS

| | | | | |
|---|---|---|---|---|
| 5,237,509 A | * | 8/1993 | Ueta ............... | G05B 19/402 318/632 |
| 5,440,398 A | * | 8/1995 | Holowko ......... | B41C 1/04 358/3.29 |
| 5,631,851 A | * | 5/1997 | Tanaka ........... | G05B 19/4062 700/174 |
| 5,730,643 A | * | 3/1998 | Bartlett .......... | B23Q 11/08 451/11 |

(Continued)

FOREIGN PATENT DOCUMENTS

| | | |
|---|---|---|
| JP | H04336927 A | 11/1992 |
| JP | 2003340661 * | 12/2003 ............ B23Q 1/00 |

*Primary Examiner* — Brian W Wathen
*Assistant Examiner* — Olvin Lopez Alvarez
(74) *Attorney, Agent, or Firm* — Miller, Matthias & Hull LLP

(57) ABSTRACT

A machine tool includes a bed supported on a ground by supporting jigs, a table movable in an X-axis direction, a spindle head movable in a Y-axis direction, a quill provided to be movable in a Z-axis direction, a spindle supported by the quill to be rotatable about its axis, feed mechanisms for moving the table and the like in the axis directions, and a numerical controller controlling operation of the feed mechanisms, and the numerical controller is configured to calculate motion errors based on load values acting on the supporting jigs by a motion locus estimator, an influence coefficient storage, a motion error calculator, and a motion locus storage, generate a correction signal for compensating for the motion errors by a position corrector, and add the generated correction signals to a position control signal transmitted from a position generator to a position controller.

9 Claims, 9 Drawing Sheets

(56) References Cited

U.S. PATENT DOCUMENTS

| | | | | |
|---|---|---|---|---|
| 5,876,012 A | * | 3/1999 | Haga | F16F 15/02 |
| | | | | 248/550 |
| 6,230,070 B1 | * | 5/2001 | Yodoshi | B23Q 1/267 |
| | | | | 700/162 |
| 6,681,146 B2 | * | 1/2004 | Kawase | G05B 19/19 |
| | | | | 700/192 |
| 2002/0007240 A1 | * | 1/2002 | Winkler | G06K 9/00362 |
| | | | | 701/49 |
| 2003/0205984 A1 | * | 11/2003 | Yoshida | G05B 19/404 |
| | | | | 318/801 |
| 2009/0015668 A1 | * | 1/2009 | Tian | G06T 7/593 |
| | | | | 348/92 |
| 2009/0030545 A1 | * | 1/2009 | Masuya | B23Q 17/12 |
| | | | | 700/175 |
| 2009/0138126 A1 | * | 5/2009 | Marsh | B66F 3/08 |
| | | | | 700/279 |
| 2010/0121478 A1 | * | 5/2010 | Jahn | G05B 19/404 |
| | | | | 700/173 |
| 2015/0033534 A1 | * | 2/2015 | Saraie | B23Q 1/0054 |
| | | | | 29/426.2 |

* cited by examiner

METHOD OF MACHINING WORKPIECE USING MACHINE TOOL, AND MACHINE TOOL

BACKGROUND

Field of the Disclosure

The present disclosure relates to a method of machining a workpiece using a machine tool and to a machine tool for performing the method, and particularly, relates to a method of machining a workpiece on a machine tool having a bed supported by a plurality of supporting jigs in a state where a position error caused by change of a horizontal level of the bed has been compensated for, and to a machine tool for performing the method.

Background of the Disclosure

A machine tool typically has a bed disposed on a floor of a plant or the like via jack bolts (supporting jigs), and horizontal level adjustment of a reference surface of the bed is performed by adjusting supporting states of the jack bolts. Note that such an adjusting operation tends to be very empirical and is a sensory operation, and therefore the operation requires skills. However, in recent years, a load detection type jack that is capable of detecting a load acting on the jack has been used, which makes the adjusting operation comparatively easy to perform By the way, the horizontal level of the bed of the machine tool is one of factors which have a large influence on accuracy in machining a workpiece. If a workpiece is machined in a state where the horizontal level is outside a predetermined range, there occurs a problem that the machining accuracy is deteriorated. Therefore, as described above, machining of a workpiece is typically performed in a state where the horizontal level of the bed reference surface of the machine tool has been adjusted. However, for example, if, after some time has passed since horizontal level adjustment, the horizontal level is changed due to a secular change of a structure, a change of surrounding environment, or the like, and therefore exceeds a predetermined range, it is not possible to accurately machine a workpiece.

Accordingly, for example, there has been proposed an automatic leveling apparatus for machine tool as disclosed in Japanese Unexamined Patent Application Publication No. H04-336927 as an apparatus which, when the horizontal level of the bed has been changed, automatically adjusts a horizontal level of a bed so that the horizontal level falls within a predetermined range.

This automatic leveling apparatus includes leveling detecting means that detects a level change of the bed, a plurality of leveling blocks that are disposed below the bed and are configured to be driven by their respective hydraulic cylinders, and control means that controls the hydraulic cylinders in accordance with a signal relating to the level change detected by the leveling detecting means.

According to this automatic leveling apparatus, the necessity of level correction is determined based on whether the level change detected by the leveling detecting means is within a predetermined range or not, and when the level change is not within the predetermined range and level correction is therefore needed, the hydraulic cylinders drive their respective leveling blocks under control by the control means, whereby leveling is automatically performed.

SUMMARY OF THE DISCLOSURE

However, in the above-described conventional automatic leveling apparatus, the determination that level correction is needed is made when the level change detected by the leveling detecting means is not within the predetermined range, and then leveling is automatically performed; therefore, leveling is not performed until the detected level change exceeds the predetermined range.

Therefore, a minute level change is ignored when the level change is within the predetermined range; therefore, in a case where machining which requires such a high accuracy that even a minute level change is not allowed to be ignored is performed, there occurs a problem that the required accuracy cannot be satisfied.

Although this problem can be solved by narrowing the range for the determination the necessity of level correction, if the range is narrowed, leveling is performed each time a minute level change is detected, and therefore there occurs another problem that machining efficiency is considerably lowered.

The present disclosure has been achieved in view of the above-described circumstances, and an object thereof is to provide a workpiece machining method using a machine tool which enables machining a workpiece with very high accuracy while preventing machining efficiency from being considerably lowered, and the machine tool.

The present disclosure, for solving the above-described problems, relates to a method of machining a workpiece with a machine tool supported by a plurality of supporting jigs having an adjusting mechanism for adjusting a vertical support position and a load cell detecting a support load, including:

estimating, based on the support loads detected by the load cells of the supporting jigs, a motion locus of relative motion of a tool attached to the machine tool and the workpiece;

calculating motion errors between the estimated motion locus and a preset reference motion locus at predetermined intervals in a motion direction;

correcting the relative motion of the tool and the workpiece based on the calculated motion errors so as to compensate for the motion errors, and then machining the workpiece; and emitting an alarm at least when a maximum value of the calculated motion errors exceeds a predetermined reference value or when a variation value of the motion errors in the motion direction exceeds a predetermined reference value.

This machining method is preferably performed by a machine tool including:

a bed;

a plurality of supporting jigs having an adjusting mechanism for adjusting a vertical support position and a load cell detecting a support load, and supporting the bed at predetermined support positions;

a workpiece holder disposed on the bed for holding a workpiece;

a tool holder disposed on the bed for holding a tool;

a feed device moving the workpiece holder and the tool holder relative to each other; and a numerical controller generating a position control signal in accordance with a machining program for machining the workpiece into a target shape with the tool, and numerically controlling operation of the feed device in accordance with the generated position control signal, the machine tool further including:

a motion error calculator estimating, based on the support loads detected by the load cells of the supporting jigs, a motion locus of relative motion of the tool and the workpiece moved by the feed device, and calculating motion errors between the estimated motion locus and a preset reference motion locus at predetermined intervals in a motion direction; and a motion error judgment part outputting an alarm signal at least when a maximum value of the motion errors calculated by the motion error calculator exceeds a predetermined reference value or when a variation value of the motion errors in the motion direction exceeds a predetermined reference value, and the numerical controller being configured to, when generating the position control signal, generate, based on the motion errors calculated by the motion error calculator, such a position control signal that the motion errors have been compensated for.

According to this machine tool, first, the motion error calculator estimates a motion locus of relative motion of the tool and the workpiece based on support loads detected by the load cells and calculates motion errors between the estimated motion locus and a preset reference motion locus at predetermined intervals in a motion direction.

Subsequently, the numerical controller generates, based on the calculated motion errors, such a position control signal that the motion errors have been compensated for, and controls operation of the feed device in accordance with the generated position control signal to move the tool holder and the workpiece holder relative to each other. Note that, as for the mode in which the numerical controller generates such a position control signal that the motion errors have been compensated for, for example, if the machining program includes a specified command, the numerical controller may generate such a position control signal that the motion errors have been compensated for in accordance with the command, or regardless of whether the machining program includes a specified command or not, the numerical controller may generate such a position control signal that the calculated motion errors have been compensated for as a series of processing.

Thus, in this machine tool, such a position control signal that the motion errors have been compensated for is generated and operation of the feed device is controlled in accordance with the position control signal to move the tool holder and the workpiece holder relative to each other. Therefore, in a case of a minute motion error, it is possible to move the tool holder and the workpiece holder relative to each other and thereby machine a workpiece in a state where the motion error has been compensated for; consequently, it is possible to machine the workpiece with high accuracy while preventing machining efficiency from being considerably lowered.

Further, the aforementioned workpiece machining method is preferably performed by a machine tool including:
 a bed;
 a plurality of supporting jigs having an adjusting mechanism for adjusting a vertical support position and a load cell detecting a support load, and supporting the bed at predetermined support positions;
 a workpiece holder disposed on the bed for holding a workpiece;
 a tool holder disposed on the bed for holding a tool;
 a feed device moving the workpiece holder and the tool holder relative to each other; and
 a numerical controller generating a position control signal in accordance with a machining program for machining the workpiece into a target shape with the tool, and numerically controlling operation of the feed device in accordance with the generated position control signal, the machine tool further including:

a motion error calculator estimating, based on the support loads detected by the load cells of the supporting jigs, a motion locus of relative motion of the tool and the workpiece moved by the feed device, and calculating motion errors between the estimated motion locus and a preset reference motion locus at predetermined intervals in a motion direction;
 a motion error judgment part outputting an alarm signal at least when a maximum value of the motion errors calculated by the motion error calculator exceeds a predetermined reference value or when a variation value of the motion errors in the motion direction exceeds a predetermined reference value; and
 a position corrector successively receiving the position control signal generated by the numerical controller, generating a correction signal for the received position control signal based on the motion errors calculated by the motion error calculator, and adding the generated correction signal to the position control signal in the numerical controller.

According to this machine tool, similarly to the foregoing machine tool, first, the motion error calculator calculates the motion errors at predetermined intervals in the motion direction.

Subsequently, the position corrector successively receives the position control signal generated by the numerical controller, generates a correction signal for the received position control signal based on the calculated motion errors, and adds the generated correction signal to the position control signal in the numerical controller. The numerical controller controls operation of the feed device in accordance with the position control signal to which the correction signal has been added to move the tool holder and the workpiece holder relative to each other.

Thus, in this machine tool, a correction signal for compensating for the calculated motion errors is generated and the generated correction signal is added to the position control signal, and operation of the feed device is controlled in accordance with the position control signal to which the correction signal has been added. Therefore, similarly to the foregoing machine tool, in a case of a minute motion error, it is possible to move the tool holder and the workpiece holder relative to each other and thereby machine a workpiece in a state where the motion error have been compensated for; consequently, it is possible to machine the workpiece with high accuracy while preventing machining efficiency from being considerably lowered.

By the way, in a case where a value of the calculated motion errors is too large and in a case where a variation value of the motion errors in the motion direction is too large, a problem may occur that machining accuracy is lowered when the tool holder and the workpiece holder are moved relative to each other so that the motion errors are compensated for, for example, accuracy of form, such as flatness, and surface roughness of a machined surface of the workpiece are deteriorated.

Accordingly, the machine tool of the present disclosure has a configuration in which the motion errors calculated by the motion error calculator are transmitted to the motion error judgment part, and, in a case where a maximum value of the calculated motion errors exceeds a predetermined reference value when comparison is made between the maximum value and the reference value in the motion error judgment part, or in a case where a variation value of the motion errors in the motion direction exceeds a predetermined reference value when comparison is made between the variation value and the reference value in the motion error judgment part, the motion error judgment part outputs an alarm signal. Note that, when an alarm signal is output, for example, machining may be stopped or a warning may be displayed on an operation panel to cause an operator to adjust the support positions.

Therefore, according to the machine tool of the present disclosure, it is possible to prevent the problem that, in the case where a value of the calculated motion errors or a variation value of the motion errors in the motion direction exceeds a predetermined reference value, machining accuracy is lowered when, based on the motion errors, the tool holder and the workpiece holder are moved relative to each other so that the motion errors are compensated for.

Note that the motion error calculator may be configured to estimate the motion locus of relative motion of the tool and the workpiece based on a previously obtained relational equation between support loads acting on the supporting jigs and motion locus of relative motion of the tool and the workpiece as well as the support loads detected by the load cells of the supporting jigs. In this case, machining of a workpiece can be smoothly performed since the previously obtained relational equation is used.

As described above, according to the workpiece machining method using machine tool and the machine tool of the present disclosure, it is possible to machine a workpiece with high accuracy while preventing machining efficiency from being lowered.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Figure 1:
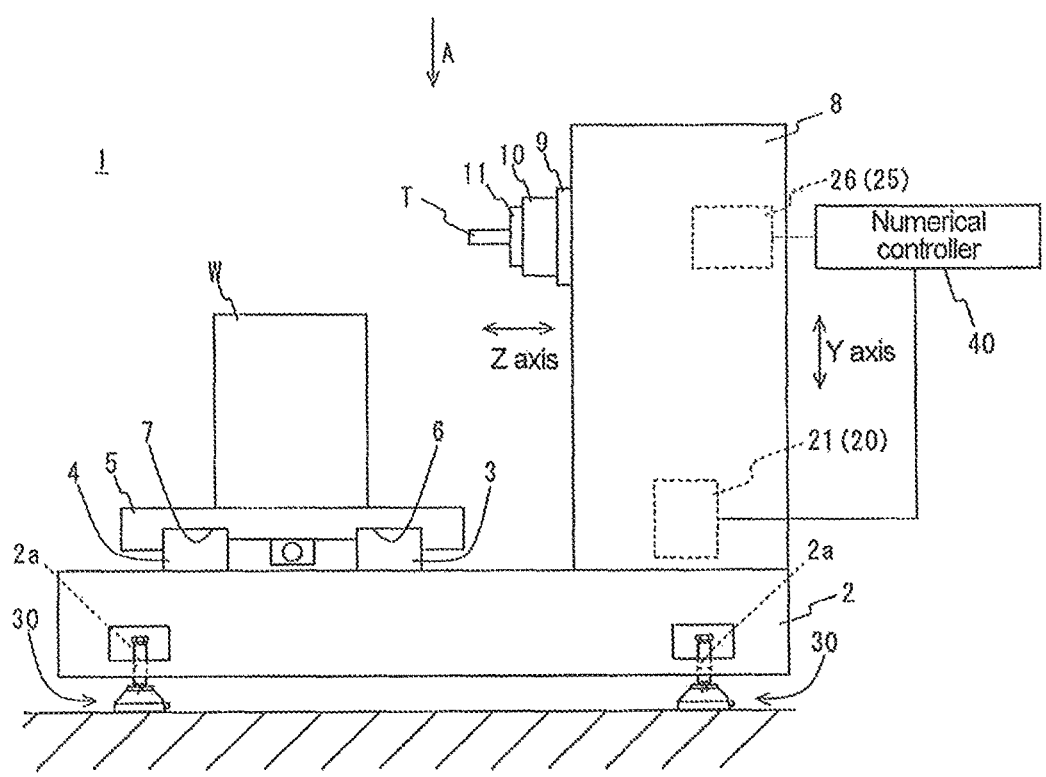
FIG. 1 is a schematic view showing an appearance of a machine tool according to an embodiment of the present disclosure.
Figure 2:
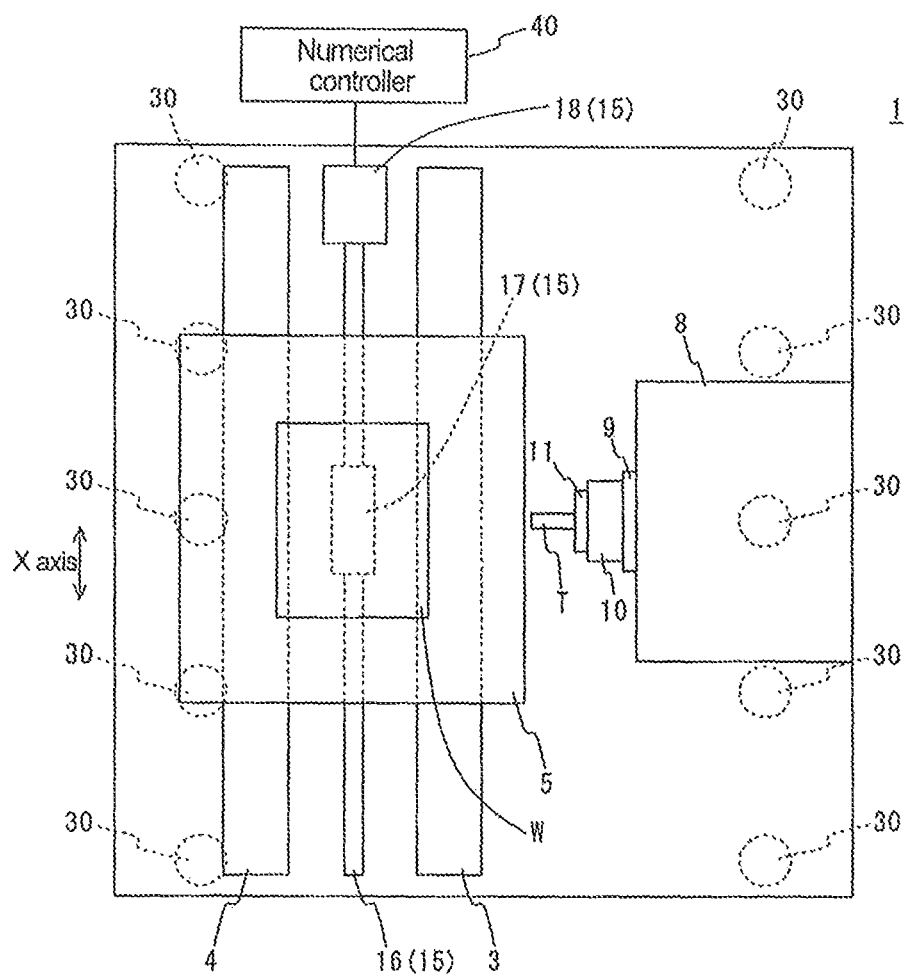
FIG. 2 is a plan view as viewed in the arrow A direction in FIG. 1.

Hereinafter, an embodiment of the present disclosure will be described with referenced to the drawings.
1. Overall Configuration of Machine Tool As shown in FIGS. 1 and 2, a machine tool 1 of the embodiment includes a bed 2 that is disposed on a ground via supporting jigs 30 and has two guide portions 3 and 4 (a first guide portion 3 and a second guide portion 4) aligned on the top surface thereof, a table 5 that has two sliding portions 6 and 7 (a first sliding portion 6 and a second sliding portion 7) provided on the lower surface thereof and is disposed on the bed 2 to be movable in an X-axis direction as a horizontal direction with the sliding portions 6 and 7 in engagement with the two guide portions 3 and 4, a column 8 that is disposed on the top surface of the bed 2, a quill 9 that is supported by the column 8 and is provided to be movable in a Y-axis direction as a vertical direction, a spindle head 10 that is supported by the quill 9 to be movable in a Z-axis direction orthogonal to both the X-axis direction and the Y-axis direction and to be rotatable about an axis parallel to the Z axis, and a spindle 11 that is supported by the spindle head 10 and has a distal end to which a tool T is to be attached.

Further, the machine tool 1 includes an X-axis feed mechanism 15 that is composed of a feed screw 16 provided between the two guide portions 3 and 4 in parallel with them, a nut 17 fixed on the lower surface of the table 5 and screwed with the feed screw 16, and an X-axis servo motor 18 rotating the feed screw 16 about its axis and moves the table 5 in the X-axis direction, as well as a Y-axis feed mechanism 20 composed of a Y-axis servo motor 21 and other components and moving the quill 9 in the Y-axis direction and a Z-axis feed mechanism 25 composed of a Z-axis servo motor 26 and other components and moving the spindle head 10 in the Z-axis direction. Furthermore, the machine tool 1 includes a numerical controller 40 controlling operation of the X-axis feed mechanism 15, the Y-axis feed mechanism 20, and the Z-axis feed mechanism 25.

Figure 3:
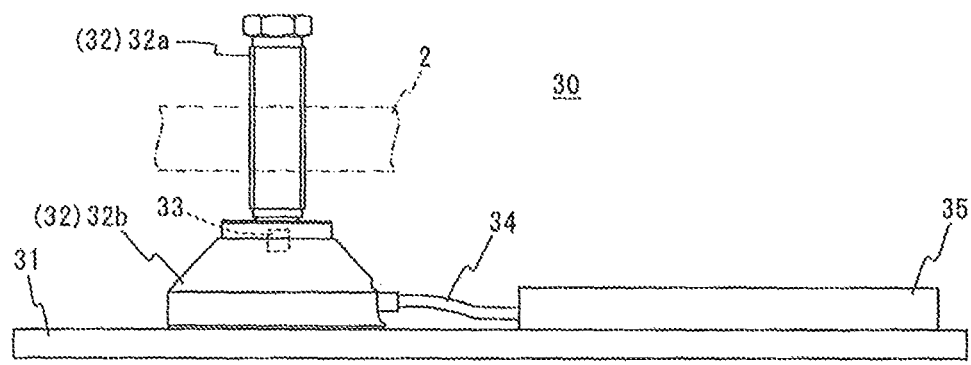
FIG. 3 is a schematic view showing an appearance of a supporting jig used for supporting the machine tool on a ground.

Further, as shown in FIG. 3, the supporting jigs 30 for supporting the bed 2 are each composed of a plate-shaped base 31, a jack portion 32 that consists of a bolt portion 32a having a screw groove formed in an outer peripheral surface thereof and a basal portion 32b supporting the bolt portion 32a and is disposed on the base 31 for adjusting a vertical support position, a load cell 33 that is disposed inside the basal portion 32b for measuring a load acting on itself, a transmission cord 34 for transmitting load data measured by the load cell 33, and a transmitter 35 that receives the load data from the load cell 33 via the transmission cord 34 and wirelessly transmits the received load data to the numerical controller 40. The supporting jig 30 is configured to support the bed 2 by screwing the bolt portion 32a in attachment screw hole 2a formed in the lower surface of the bed 2; a load from the bed 2 is transmitted to the load cell 33 via the bolt portion 32a. Note that the support position for supporting the bed 2 can be adjusted by rotating the bolt portion 32a (operating the jack portions 32). Further, in this embodiment, the bed 2 is supported by ten supporting jigs 30; the ten supporting jigs 30 are arranged in lines, each of which consists of five supporting jigs 30, at left and right sides of the bed 2 with respect to the drawing sheet in FIG. 2 so that the lines are parallel with the guide direction of the first and second guide portions 3 and 4 (the X-axis direction), and the supporting jigs 30 in each line are arranged at regular intervals.

2. Configuration of Numerical Controller

Figure 4:
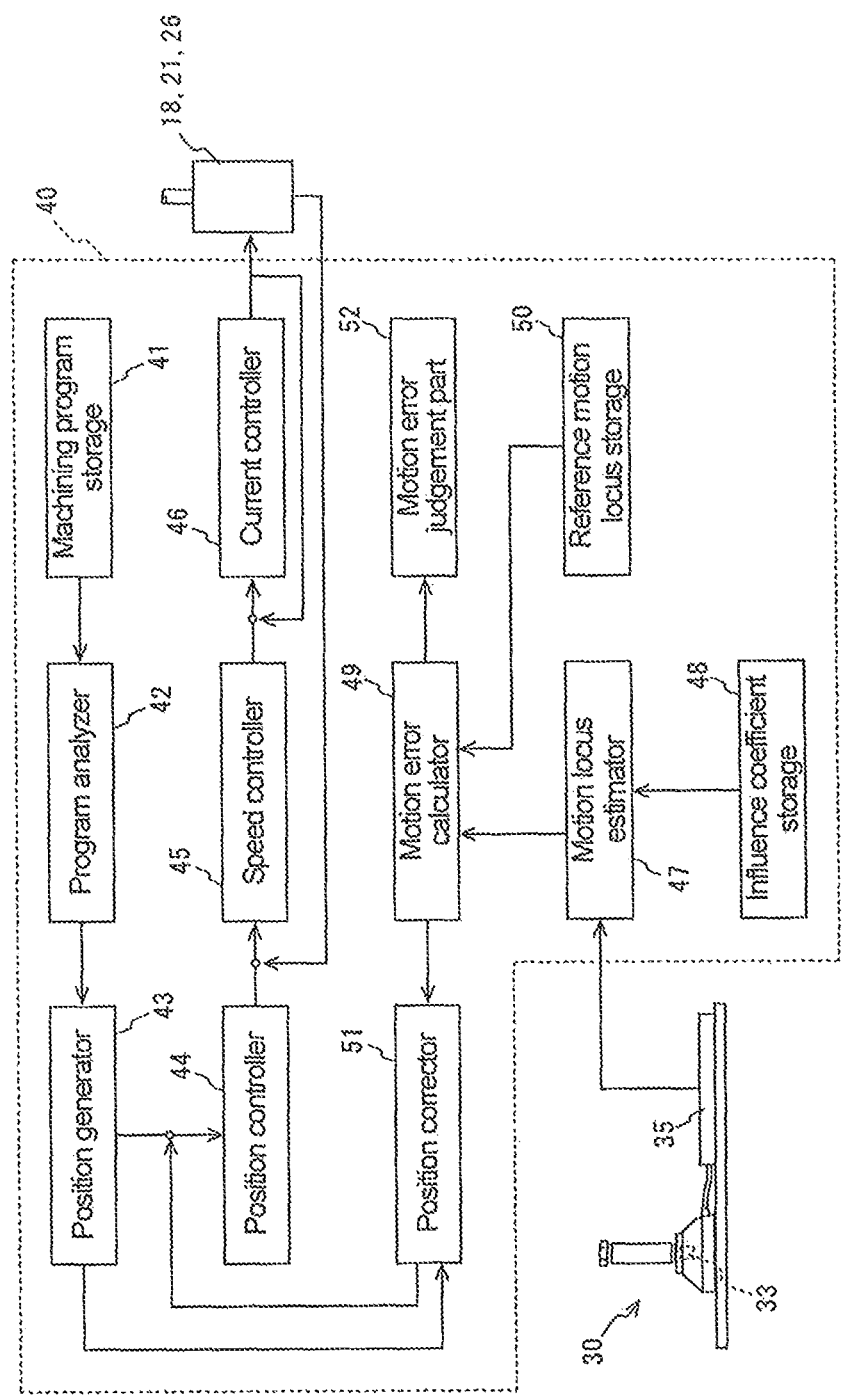
FIG. 4 a is block diagram showing a configuration example of a numerical controller in the embodiment.

A configuration (functional blocks) of the numerical controller 40 is described using FIG. 4. As shown in FIG. 4, the numerical controller 40 consists of a machining program storage 41, a machining program analyzer 42, a position generator 43, a position controller 44, a speed controller 45, a current controller 46, a motion locus estimator 47, an influence coefficient storage 48, a motion error calculator 49, a reference motion locus storage 50, a position corrector 51, and a motion error judgment part 52.

The machining program storage 41 is a functional unit storing a previously generated machining program therein, and transmits a stored machining program to the program analyzer 42.

The program analyzer 42 analyzes the machining program received from the machining program storage 41 to extract commands relating to feed speeds and moving positions of the X-axis feed mechanism 15, the Y-axis feed mechanism 20, and the Z-axis feed mechanism 25, and transmits the extracted commands to the position generator 43.

The position generator 43 generates signals (motion command signals, which are control signals) relating to target moving positions of the X-axis feed mechanism 15, the Y-axis feed mechanism 20, and the Z-axis feed mechanism 25 every a period of time (a predetermined period of time) based on signals received from the program analyzer 42 taking a predetermined time constant into consideration, and successively transmits the generated signals to the position controller 44 and the position corrector 51.

The position controller 44 generates speed command signals based on the motion command signals (position control signals) transmitted from the position generator 43 and correction signals transmitted from the position corrector 51, and transmits the generated speed command signals to the speed controller 45.

The speed controller 45 generates current command signals based on deviations between the speed command signals transmitted from the position controller 44 and actual speed data transmitted (fed back) as appropriate from position detectors (not shown) provided on the X-axis servo motor 18, the Y-axis servo motor 21, and the Z-axis servo motor 26, and transmits the generated current command signals to the current controller 46.

Further, the current controller 46 transmits drive currents based on deviations between the current command signals transmitted from the speed controller 45 and actual current signals fed back thereto to the X-axis servo motor 18, the Y-axis servo motor 21, and the Z-axis servo motor 26. Consequently, operation of the X-axis servo motor 18, the Y-axis servo motor 21, and the Z-axis servo motor 26 is controlled in accordance with the drive currents.

The motion locus estimator 47 estimates a motion locus of relative motion of a workpiece W and the tool T based on load values detected by the load cells 33 of the ten supporting jigs 30 and transmitted thereto from the transmitters 35 and an influence coefficient matrix stored in the influence coefficient storage 48, and transmits the estimated motion locus to the motion error calculator 49.

In the estimation of the motion locus, first, height positions in the vertical direction (Y-axis direction) are calculated for ten positions ($Y_1$ to $Y_{10}$ in FIG. 5) at the first and second guide portion 3 and 4 based on the transmitted load values in accordance with Equation 1 given below.

$$S_{10} = A_{10,10} \times F_{10}, \quad \text{Equation 1}$$

where $$F_{10} = \begin{pmatrix} f_1 \\ f_2 \\ \vdots \\ f_9 \\ f_{10} \end{pmatrix}$$

-continued $$S_{10} = \begin{pmatrix} s_1 \\ s_2 \\ \vdots \\ s_9 \\ s_{10} \end{pmatrix}$$

$$A_{10,10} = \begin{pmatrix} a_{1,1} & a_{1,2} & \cdots & a_{1,9} & a_{1,10} \\ a_{2,1} & a_{2,2} & \cdots & a_{2,9} & a_{2,10} \\ \vdots & \vdots & \ddots & \vdots & \vdots \\ a_{9,1} & a_{9,2} & \cdots & a_{9,9} & a_{9,10} \\ a_{10,1} & a_{10,2} & \cdots & a_{10,9} & a_{10,10} \end{pmatrix}$$

In Equation 1 given above, $F_{10}$ is a ten-by-one matrix and $f_1$ to $f_{10}$ are the load values detected by the load cells 33 of the supporting jigs 30 positioned at positions $X_1$ to $X_{10}$, respectively. Further, $S_{10}$ is a ten-by-one matrix and $s_1$ to $s_{10}$ are the height positions at the ten positions ($Y_1$ to $Y_{10}$ in FIG. 5) at the first guide portion 3 and the second guide portion 4. Furthermore, $A_{10,10}$ is a ten-by-ten matrix (influence coefficient matrix) and $a_{1,1}$ to $a_{10,10}$ in the matrix are previously calculated values and are coefficients representing the degree of influence of the load values detected by the load cells 33 of the supporting jigs 30 upon the height positions at the ten positions at the first and second guide portions 3, 4, which will be described later. Note that the load values may be actual values or may be variations from a predetermined reference value. In the case of actual values, the calculated height positions are also actual values; while in the case of variations from a reference value, the obtained height positions are positions obtained by subtracting a reference height position from actual height positions (hereinafter, such a position is referred to as "variation position").

Figure 5:
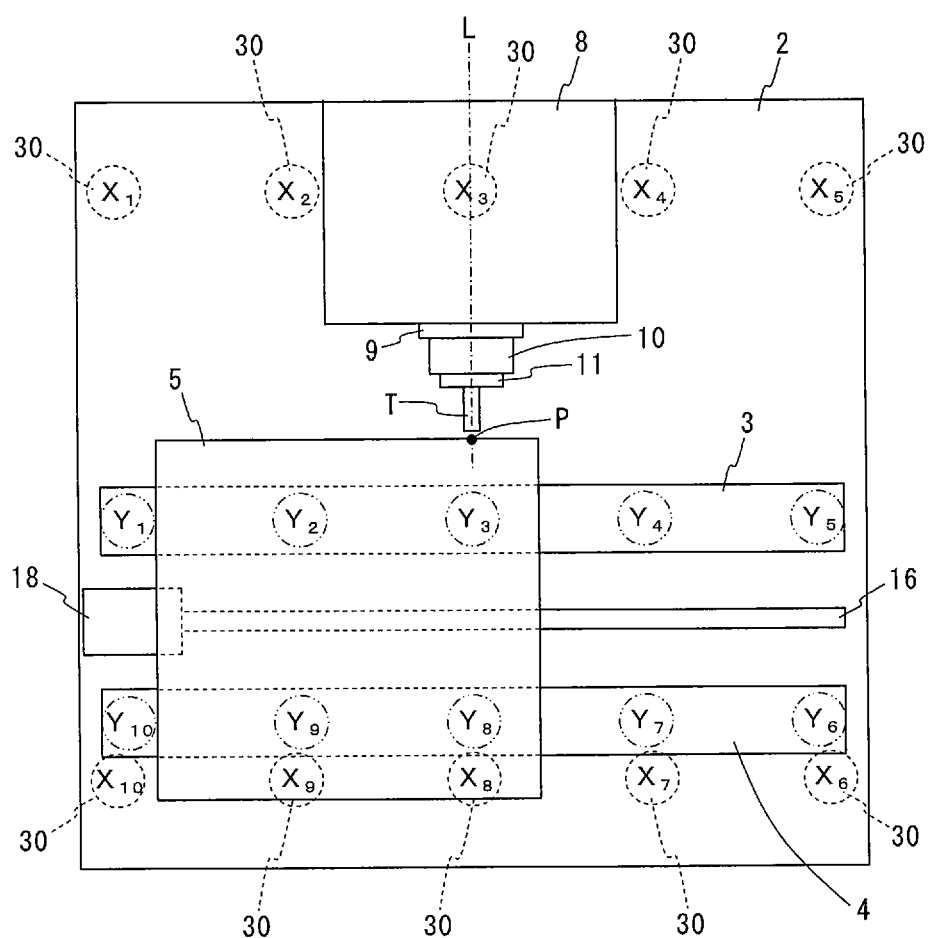
FIG. 5 is an illustration for explaining a method of estimating a motion locus.

Subsequently, a motion locus of relative motion of a workpiece W and the tool T is estimated based on the calculated height positions or variation positions at the ten positions. Specifically, as shown in FIG. 5, height positions or variation positions of a point P (intersection P), at which a Y-Z plane including the axis of the spindle 11 (the dotted and dashed line L in FIG. 5) and the top surface of the table 5 (reference surface) intersect, when the table 5 is moved in the X-axis direction are calculated at predetermined intervals in the moving direction of the table 5 (the X-axis direction) by the CAE analysis or the like based on the height positions or variation positions at the positions $Y_1$ to $Y_{10}$ at the first and second guide portions 3 and 4, and a line connecting the calculated positions is estimated to be a motion locus of relative motion of the workpiece W and the tool T; this method is an example. In this embodiment, the point P is set on the top surface of the table 5 and the motion locus is estimated based on height positions or variation positions of the point P for the reason that the workpiece W is placed on the top surface of the table 5. Note that depiction of the workpiece W is omitted in FIG. 5.

Note that the influence coefficient matrix is previously calculated and stored in the influence coefficient storage 48, which is to be transmitted as appropriate from the influence coefficient storage 48 to the motion locus estimator 47. Also note that the influence coefficient matrix stored in the influence coefficient storage 48 was defined by the inventors of the present application based on their findings described below.

Figure 6:
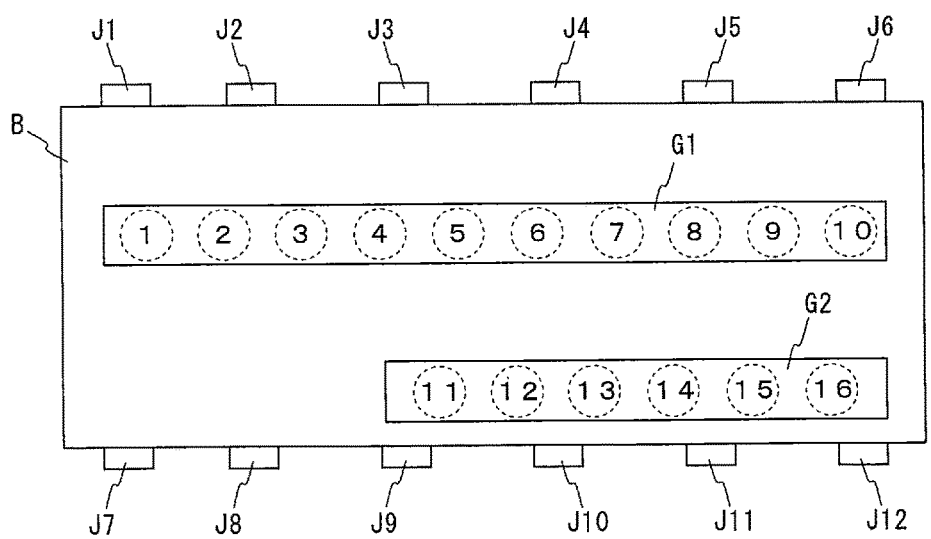
FIG. 6 is an illustration used for explaining an influence coefficient.
Figure 7A:
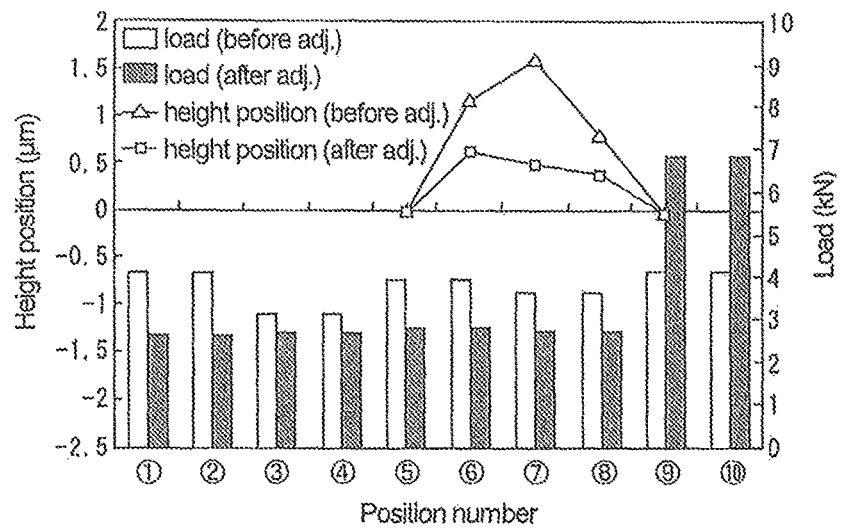
FIG. 7 is an illustration used for explaining the influence coefficient.
Figure 7B:
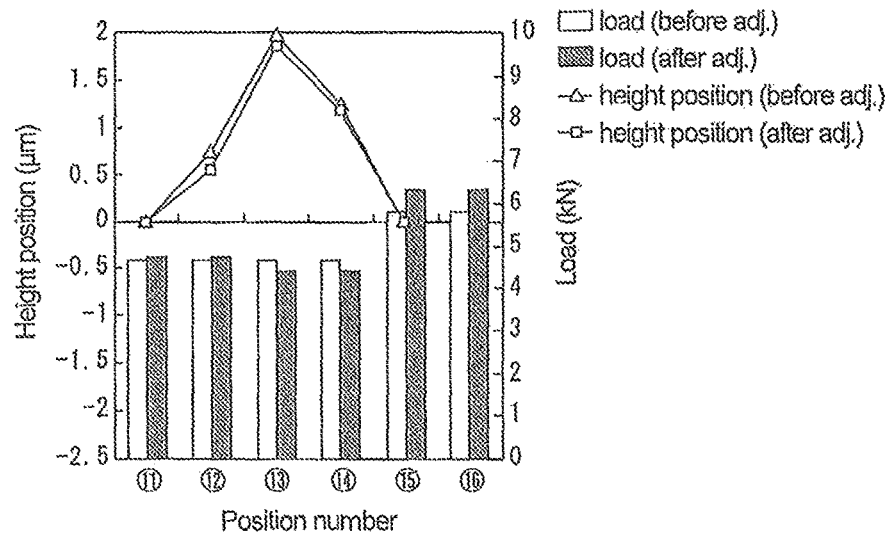

The inventors measured loads acting on twelve supporting jigs (J1 to J12 in FIG. 6) that were supporting a bed B having two parallel guide portions G1 and G2 provided on the top surface thereof on a ground (see FIG. 6), and height positions at sixteen positions (positions indicated by numerals 1 to 16 in FIG. 6) at the two guide portions G1 and G2. In the measurement, as shown in FIG. 7, the distribution of height position at the guide portion G1 had a convex form with the peak at the position indicated by numeral 7, while the distribution of height position at the guide portion G2 had a convex form with the peak at the position indicated by numeral 13. Accordingly, the inventors moved the support positions of the two supporting jigs J5 and J6 upward to increase the loads acting on the two supporting jigs J5 and J6, whereby the height positions at the positions indicated by numerals 6, 7 and 8 were greatly lowered and the height positions at the positions indicated by numerals 12, 13 and 14 were also changed somewhat. This means that the height position at a certain position at a guide portion is greatly influenced by load values acting on supporting jigs arranged near the certain position, while it is also influenced somewhat by load values acting on the other supporting jigs. Based on these facts, the inventors found out that calculating the degrees of influence of each supporting jig upon the height position at each position as influence coefficients enables calculating a height position at each position based on load values of all supporting jigs.

Specifically, the influence coefficient matrix consisting of influence coefficients representing the degrees of influence of the supporting jigs upon the height positions at the positions can be calculated in the following manner. In this example, first, in a state where the bed 2 is being supported by the ten supporting jigs 30, the jack portion 32 of any one of the supporting jigs 30 is operated, and a load value detected by the load cell 33 of the supporting jig 30 whose jack portion 32 was operated and load values detected by the load cells 33 of the supporting jigs 30 whose jack portions 32 were not operated are recorded and the then height positions or variation positions at the ten positions at the first and second guide portions 3 and 4 are also recorded. Thereafter, in the same manner, the jack portions 32 of the remaining nine supporting jigs 30 are operated one after another, and in each operation, a load value detected by the load cell 33 of the supporting jig 30 whose jack portion 32a was operated, load values detected by the load cells 33 of the supporting jigs 30 whose jack portions 32 were not operated, and the then height positions or variation positions at the ten positions at the first and second guide portions 3 and 4 are recorded. Thereafter, the influence coefficient matrix is calculated in accordance with Equation 2 given below based on the obtained load values and height positions or variation positions.

$$S_{10,10}' = A_{10,10} \times F_{10,10}', \quad \text{Equation 2}$$

where $$S_{10,10}' = \begin{pmatrix} s_{1,1} & s_{1,2} & \cdots & s_{1,9} & s_{1,10} \\ s_{2,1} & s_{2,2} & \cdots & s_{2,9} & s_{2,10} \\ \vdots & \vdots & \ddots & \vdots & \vdots \\ s_{9,1} & s_{9,2} & \cdots & s_{9,9} & s_{9,10} \\ s_{10,1} & s_{10,2} & \cdots & s_{10,9} & s_{10,10} \end{pmatrix}$$

$$F_{10,10}' = \begin{pmatrix} f_{1,1} & f_{1,2} & \cdots & f_{1,9} & f_{1,10} \\ f_{2,1} & f_{2,2} & \cdots & f_{2,9} & f_{2,10} \\ \vdots & \vdots & \ddots & \vdots & \vdots \\ f_{9,1} & f_{9,2} & \cdots & f_{9,9} & f_{9,10} \\ f_{10,1} & f_{10,2} & \cdots & f_{10,9} & f_{10,10} \end{pmatrix}$$

-continued $$A_{10,10} = \begin{pmatrix} a_{1,1} & a_{1,2} & \cdots & a_{1,9} & a_{1,10} \\ a_{2,1} & a_{2,2} & \cdots & a_{2,9} & a_{2,10} \\ \vdots & \vdots & \ddots & \vdots & \vdots \\ a_{9,1} & a_{9,2} & \cdots & a_{9,9} & a_{9,10} \\ a_{10,1} & a_{10,2} & \cdots & a_{10,9} & a_{10,10} \end{pmatrix}.$$

Note that, in Equation 2, $F_{10,10}'$ is a ten-by-ten matrix, and $f_{1,1}$ to $f_{10,10}$ in the matrix are the above-described load values detected by the ten load cells 33. Specifically, $f_{1,1}$ to $f_{10,1}$ are the load values detected after the jack portion 32 of one of the ten supporting jigs 30 (the supporting jig positioned at the position $X_1$ in FIG. 5) is operated, the load value detected by the load cell 33 of the supporting jig 30 whose jack portion 32 was operated is $f_{1,1}$, and the load values detected by the load cells 33 of the other supporting jigs 30 whose jack portions 32 were not operated (the supporting jigs positioned at the positions $X_2$ to $X_{10}$ in FIG. 5) are $f_{2,1}$ to $f_{10,1}$, respectively. Similarly, $f_{1,2}$ to $f_{10,2}$ are the load values detected after the jack portion 32 of another one of the supporting jigs 30 (the supporting jig positioned at the position $X_2$ in FIG. 5) is operated, the load value detected by the load cell 33 of the supporting jig 30 whose jack portion 32 was operated is $f_{2,2}$, and the load values detected by the load cells 33 of the supporting jigs 30 whose jack portions 32 were not operated (the supporting jigs positioned at the positions $X_1$, $X_3$ to $X_{10}$ in FIG. 5) are $f_{1,2}$, $f_{3,2}$ to $f_{10,2}$, respectively. The same is applied to $f_{3,1}$ to $f_{10,10}$; they are load values detected by the load cell 33 of the supporting jig 30 whose jack portion 32 was operated and the load cells 33 of the supporting jigs 30 whose jack portions 32 were not operated after the jack portion 32 of any one of the other supporting jigs 30 has been operated.

Further, $S_{10,10}'$ is a ten-by-ten matrix and, as described above, $s_{1,1}$ to $s_{10,10}$ in the matrix are the height positions or variation positions at the ten positions at the first and second guide portions 3 and 4 after the jack portions 32 of the supporting jigs 30 are operated. Specifically, the height positions or variation positions at the positions $Y_1$ to $Y_{10}$ after the jack portion 32 of the supporting jig 30 positioned at the position $X_1$ is operated are $s_{1,1}$ to $s_{10,1}$, and similarly, the height positions or variation positions at the positions $Y_1$ to $Y_{10}$ after the jack portions 32 of the supporting jigs 30 positioned at the positions $X_2$ to $X_{10}$ are operated are $s_{1,2}$ to $s_{10,10}$.

Figure 8:
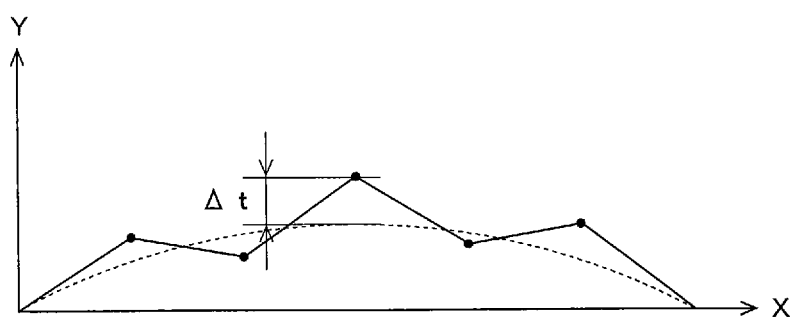
FIG. 8 is an illustration for explaining a method of calculating motion errors.

Next, the function of the motion error calculator 49 is described with reference to FIG. 8. Note that FIG. 8 is a diagram which schematically shows the estimated motion locus (solid line) and the reference motion locus (dashed line) with the X axis of the machine tool 1 as the horizontal axis and the Y axis of the machine tool 1 as the vertical axis. As shown in FIG. 8, the motion error calculator 49 calculates motion errors (Δt in FIG. 8) between the estimated motion locus (solid line) transmitted from the motion locus estimator 47 and the reference motion locus (dashed line) stored in the reference motion locus storage 50 at predetermined intervals in the direction of the relative motion of the workpiece W and the tool T, and transmits the calculated motion errors to the position corrector 51 and the motion error judgment part 52. Note that the term "motion error" in this example means a difference in the height position in the Y-axis direction between the estimated motion locus and the reference motion locus. More specifically, it is a relative position error in the Y-axis direction between the workpiece W and the tool T in a Y-Z plane including the axis of the spindle 11.

The position corrector 51 generates correction signals for the position control signals transmitted thereto from the position generator 43 based on the motion errors transmitted from the motion error calculator 49, and adds the generated correction signals to the position control signals transmitted from the position generator 43 to the position controller 44.

The motion error judgment part 52 outputs an alarm signal when the maximum value of the motion errors received from the motion error calculator 49 exceeds a predetermined reference value, that is, any one of the motion errors calculated at the predetermined intervals in the motion direction exceeds a predetermined reference value, or when a variation value in the motion direction of the motion errors received from the motion error calculator 49 exceeds a predetermined reference value, that is, a difference between a received motion error and the preceding received motion error exceeds a predetermined reference value.

Next, the process of machining a workpiece W with the machine tool 1 of the present embodiment having the above-described configuration will be described below.

In the machine tool 1, first, a machining program stored in the machining program storage 41 is read out by the program analyzer 42 and commands relating to feed speeds and moving positions in the machining program are extracted by the program analyzer 42, and the extracted commands are transmitted to the position generator 43.

The position generator 43 generates motion command signals based on signals transmitted thereto from the program analyzer 42, and transmits the generated motion command signals to the position controller 44 and the position corrector 51.

By the way, in machining of workpiece performed by a machine tool, a horizontal level of the bed is one of factors having a large influence on machining accuracy. Therefore, if the horizontal level of the bed is changed during machining and the machining is continued in a state where the horizontal level is beyond a predetermined range, there occurs a problem that machining accuracy is deteriorated. Further, even if the horizontal level is to be adjusted after exceeding the predetermined range, since the horizontal level is not adjusted until it exceeds the predetermined range, there is a problem that machining accuracy is deteriorated (even though it is slight deterioration) and it is not possible to deal with a case where an extremely high machining accuracy is required.

Accordingly, the machine tool 1 of this embodiment is configured to detect load values acting on the ten supporting jigs 30 with the load cells 33, estimate a motion locus of relative motion of a workpiece W and a tool T based on the detected load values, calculate motion errors based on the estimated motion locus, and add correction signals generated based on the calculated motion errors to the motion command signals (position control signals) transmitted from the position generator 43 to the position controller 44.

Specifically, first, load values detected by the load cells 33 of the ten supporting jigs 30 are transmitted to the motion locus estimator 47. Subsequently, as described above, the motion locus estimator 47 estimates a motion locus of relative motion of a workpiece W and a tool T based on the received load values and the influence coefficient matrix stored in the influence coefficient storage 48, and transmits the estimated motion locus to the motion error calculator 49.

The motion error calculator 49 calculates motion errors between the estimated motion locus and the reference motion locus based on the received motion locus and the reference motion locus stored in the reference motion locus storage 50, and transmits the calculated motion errors to the position corrector 51 and the motion error judgment part 52.

Thereafter, the position corrector 51 generates correction signals for the position control signals transmitted thereto from the position generator 43 based on the received motion errors, and adds the correction signals to the position controls signals transmitted from the position generator 43 to the position controller 44.

Thus, in the machine tool 1, motion errors between the estimated motion locus and the reference motion locus, in other words, differences between the then horizontal level and a reference horizontal level, are calculated, and signals for compensating for the motion errors are added to the position control signals even when the motion errors are very small. Therefore, the position control signals in which the motion errors have been compensated for are transmitted to the position controller 44

Subsequently, the position controller 44 generates speed command signals based on the position controls signals to which the correction signals have been added, and transmits the generated speed command signals to the speed controller 45. The speed controller 45 generates current command signals based on the received speed command signals and transmits the generated current command signals to the current controller 46. The current controller 46 generates drive command signals based on the received current command signals and transmits the generated drive command signals to the X-axis servo motor 18, the Y-axis servo motor 21, and the Z-axis servo motor 26, and the X-axis servo motor 18, the Y-axis servo motor 21, and the Z-axis servo motor 26 are driven and controlled in accordance with the drive command signals.

Note that, in this process, tracking errors related to speed is compensated for based on present speed data fed back from appropriate position detectors provided on the X-axis servo motor 18, the Y-axis servo motor 21, and the Z-axis servo motor 26, and tracking errors related to current are compensated for based on feedback of actual current signals.

Note that, in a case where the maximum value of the motion errors calculated by the motion error calculator 49 is too large or in the case where the variation value of the motion errors in the motion direction (X-axis direction) is too large, if machining is performed in accordance with the position control signals to which the correction signals for compensating for the motion errors have been added, it is not possible to smoothly move the workpiece W and the tool T relative to each other, which may consequently cause a problem that accuracy of form and surface roughness of a machined surface are deteriorated, that is, it is not possible to maintain a high machining accuracy.

Therefore, in the machine tool 1, the calculated motion errors are transmitted to the motion error judgment part 52 from the motion error calculator 49, and, as described above, the motion error judgment part 52 judges whether the maximum value of the received motion errors exceeds a predetermined reference value, or whether the variation value of the motion errors in the motion direction exceeds a predetermined reference value, and outputs an alarm signal when judging that the maximum value exceeds the predetermined reference value or that the variation value exceeds the predetermined reference value. Note that examples of the destination of the alarm signal output include functional units which control informing means, such as a functional unit which controls display of an operation panel and a functional unit which controls lighting of a warning lamp provided on the machine tool 1. In such a case, by displaying a warning on the operation panel or lighting the warning lamp, an operator is informed that the maximum value of the motion errors exceeds the reference value or that the variation value of the motion errors exceeds the reference value.

Thus, informing an operator of the possibility that machining accuracy is not maintained (the maximum value of the motion errors exceeds the reference value or the variation value of the motion errors exceeds the reference value) causes the operator to stop machining the workpiece W and perform an operation of adjusting the horizontal level.

As described above, according to the machine tool 1 of the present embodiment, since the motion errors are calculated based on the load values acting on the supporting jigs 30 and operation of the X-axis feed mechanism 15, operation of the Y-axis feed mechanism 20, and operation of the Z-axis feed mechanism 25 are controlled in accordance with the position control signals in which the calculated motion errors have been compensated for, it is possible to machine a workpiece W in a state where the motion errors have been compensated for even when the motion errors are very small, and therefore a very high machining accuracy is achieved. Further, in the case where a motion error which cannot be dealt with only by compensation occurs, an operator is informed thereof and is thereby prompted to perform an operation of adjusting the horizontal level, and a high machining accuracy is maintained by the operator performing the adjustment of the horizontal level.

One embodiment of the present disclosure has been described above; however, the present disclosure is not limited thereto and can be implemented in other modes.

For example, although Equation 1 given above is an equation for calculating height positions or variation positions at the positions (the ten positions $Y_1$ to $Y_{10}$) at the first and second guide portions 3 and 4 based on load values detected by the ten load cells 33, the equation can be generalized as an equation for calculating height positions or variation positions at m positions at the first and second guide portions 3 and 4 based on load values detected by n load cells 33, which is Equation 3 given below.

$$S_m = A_{m,n} \times F_n, \qquad \text{Equation 3}$$

where $$F_n = \begin{pmatrix} f_1 \\ f_2 \\ \vdots \\ f_{n-1} \\ f_n \end{pmatrix}$$

$$S_m = \begin{pmatrix} s_1 \\ s_2 \\ \vdots \\ s_{m-1} \\ s_m \end{pmatrix}$$

$$A_{m,n} = \begin{pmatrix} a_{1,1} & a_{1,2} & \cdots & a_{1,n-1} & a_{1,n} \\ a_{2,1} & a_{2,2} & \cdots & a_{2,n-1} & a_{2,n} \\ \vdots & \vdots & \ddots & \vdots & \vdots \\ a_{m-1,1} & a_{m-1,2} & \cdots & a_{m-1,n-1} & a_{m-1,n} \\ a_{m,1} & a_{m,2} & \cdots & a_{m,n-1} & a_{m,n} \end{pmatrix}.$$

Note that, in Equation 3, F is an n-by-one matrix and $f_1$ to $f_n$ are load values detected by n load cells 33. Further, S is an m-by-one matrix and $s_1$ to $s_m$ are height positions (variation values of height positions) at m positions at the first and second guide portions 3 and 4. Furthermore, A is an m-by-n matrix (influence coefficient matrix) and $a_{1,1}$ to $a_{m,n}$ are constant values representing the degrees of influence of the loads acting on the supporting jigs 30 upon the height positions at the m positions, which values are previously calculated.

Further, Equation 2 given above can be generalized as an equation (Equation 4) for calculating influence coefficients based on the load values detected by n load cells and the height positions or variation positions at m positions at the first and second guide portions 3 and 4. Note that it is preferred that n and m are equal to each other.

$$S_{m,m}' = A_{m,n} \times F_{n,m}', \qquad \text{Equation 4}$$

wherein $$F_{n,m}' = \begin{pmatrix} f_{1,1} & f_{1,2} & \cdots & f_{1,m-1} & f_{1,m} \\ f_{2,1} & f_{2,2} & \cdots & f_{2,m-1} & f_{2,m} \\ \vdots & \vdots & \ddots & \vdots & \vdots \\ f_{n-1,1} & f_{n-1,2} & \cdots & f_{n-1,m-1} & f_{n-1,m} \\ f_{n,1} & f_{n,2} & \cdots & f_{n,m-1} & f_{n,m} \end{pmatrix}$$

$$S_{m,m}' = \begin{pmatrix} s_{1,1} & s_{1,2} & \cdots & s_{1,m-1} & s_{1,m} \\ s_{2,1} & s_{2,2} & \cdots & s_{2,m-1} & s_{2,m} \\ \vdots & \vdots & \ddots & \vdots & \vdots \\ s_{m-1,1} & s_{m-1,2} & \cdots & s_{m-1,m-1} & s_{m-1,m} \\ s_{m,1} & s_{m,2} & \cdots & s_{m,m-1} & s_{m,m} \end{pmatrix}$$

$$A_{m,n} = \begin{pmatrix} a_{1,1} & a_{1,2} & \cdots & a_{1,n-1} & a_{1,n} \\ a_{2,1} & a_{2,2} & \cdots & a_{2,n-1} & a_{2,n} \\ \vdots & \vdots & \ddots & \vdots & \vdots \\ a_{m-1,1} & a_{m-1,2} & \cdots & a_{m-1,n-1} & a_{m-1,n} \\ a_{m,1} & a_{m,2} & \cdots & a_{m,n-1} & a_{m,n} \end{pmatrix}.$$

In Equation 4, F' is an n-by-m matrix, and $f_{1,1}$ to $f_{n,m}$ are, similarly to the foregoing, load values obtained by operating the jack portions 32 of the n supporting jigs 30 one after another and, after each operation, detecting the loads with the load cell 33 of the supporting jig 30 whose jack portion 32 was operated and the load cells 33 of the supporting jigs 30 whose jack portions 32 were not operated. Further, S' is an m-by-m matrix and $s_{1,1}$ to $s_{m,m}$ are height positions or variation positions at m positions at the first and second guide portions 3 and 4 when the supporting jigs 30 are operated. Furthermore, A is, similarly to the foregoing, an m-by-n matrix, and $a_{1,1}$ to $a_{m,n}$ are values calculated in accordance with Equation 4 based on the load values and the height positions or variation positions.

Further, although, in the above embodiment, correction signals are generated based on the motion errors by the position corrector 51 and the position corrector 51 adds the correction signals to the position control signals, the present disclosure is not limited thereto and another configuration is possible in which position control signals in which the motion errors have been compensated for are generated by a position generator and the position control signals in which the motion errors have been compensated for are transmitted to a position controller.

Figure 9:
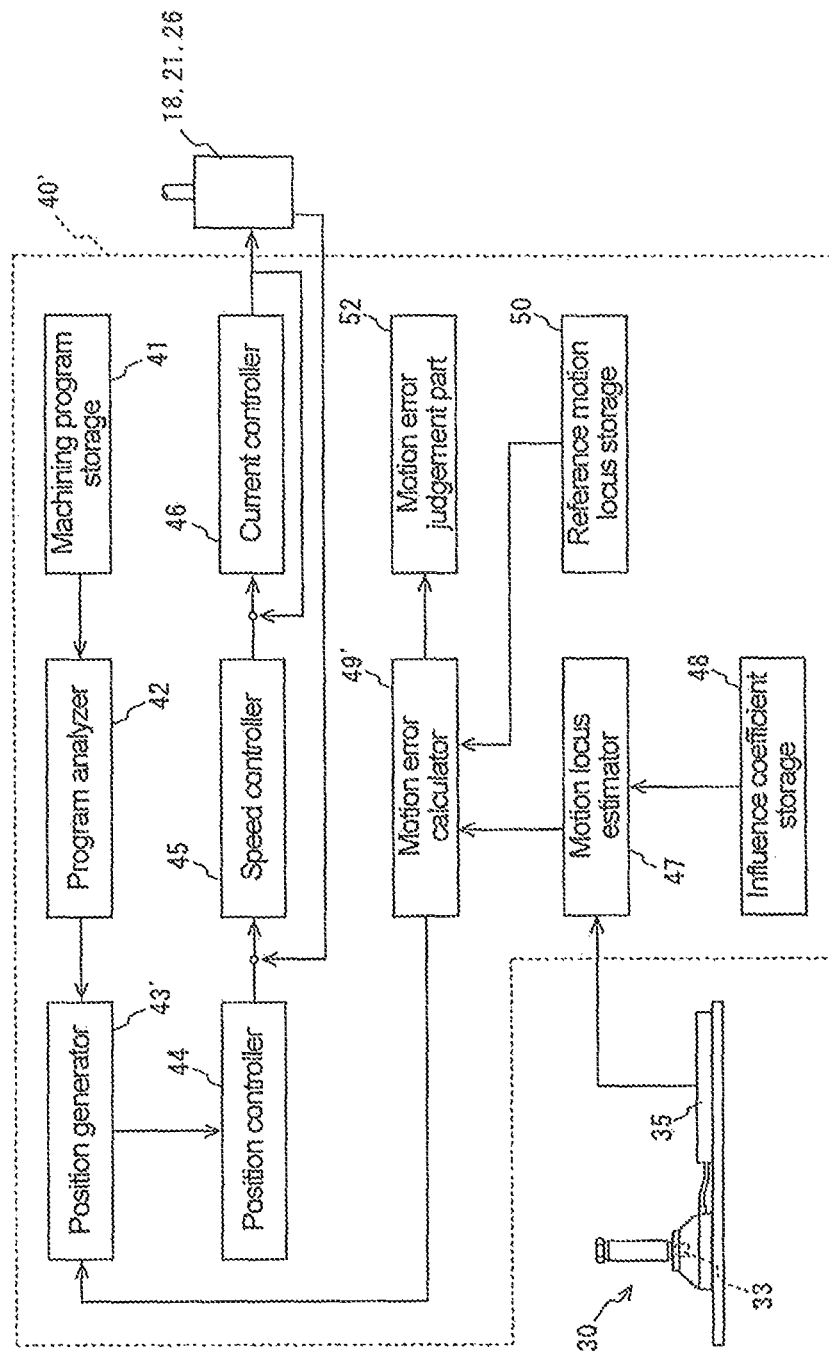
FIG. 9 is a block diagram showing a configuration example of a numerical controller in another embodiment of the present disclosure.

In this case, as shown in FIG. 9, a numerical controller 40' consists of a machining program storage 41, a program analyzer 42, a position generator 43', a position controller 44, a speed controller 45, a current controller 46, a motion locus estimator 47, an influence coefficient storage 48, a motion error calculator 49', a reference motion locus storage 50, and a motion error judgment part 52. Note that the machining program storage 41, the program analyzer 42, the position controller 44, the speed controller 45, the current controller 46, the motion locus estimator 47, the influence coefficient storage 48, the reference motion locus storage 50, and the motion error judgment part 52 are the same as those forming the numerical controller 40.

In the numerical controller 40', the motion error calculator 49' transmits generated motion errors to the position generator 43', and the position generator 43' generates position control signals in which the motion errors have been compensated for based on signals received from the program analyzer 42 and the motion errors received from the motion error calculator 49', and transmits the generated position control signals to the position controller 44.

Note that the position generator 43' may be configured to generate position control signals in which the motion errors have been compensated for only when a predetermined code is written in the machining program and generate position control signals based on only signals received from the program analyzer 42 when the predetermined code is not written in the machining program, or may be configured to generate position control signals in which the motion errors have been compensated for regardless of whether a predetermined code is written in the machining program or not.

Also in this configuration in which position control signals in which the motion errors have been compensated for are generated by the position generator 43', operation of the X-axis feed mechanism 15, operation of Y-axis feed mechanism 20, and operation of the Z-axis feed mechanism 25 can be controlled in accordance with position control signals in which the motion errors have been compensated for, similarly to the foregoing embodiment. Therefore, even when a minute motion error occurs, the motion error can be compensated for and a workpiece W can be machined with high accuracy.

Further, although, in the above embodiment, position control signals in which the motion errors have been compensated for are transmitted to the position controller 44, the present disclosure is not limited thereto and another configuration is possible in which position control signals in which not only the motion errors but also pitch errors and straightness have been compensated for are transmitted to the position controller 44.

Further, although, in the above embodiment, when a motion locus is estimated, the point P at which a Y-Z plane including the axis of the spindle 11 and the top surface of the table 5 intersect is a point to be corrected (correction target point) and height positions or variation positions of the point P are calculated at predetermined intervals in the moving direction of the table 5, the correction target point is not limited thereto and may be any other point.

Figure 10:
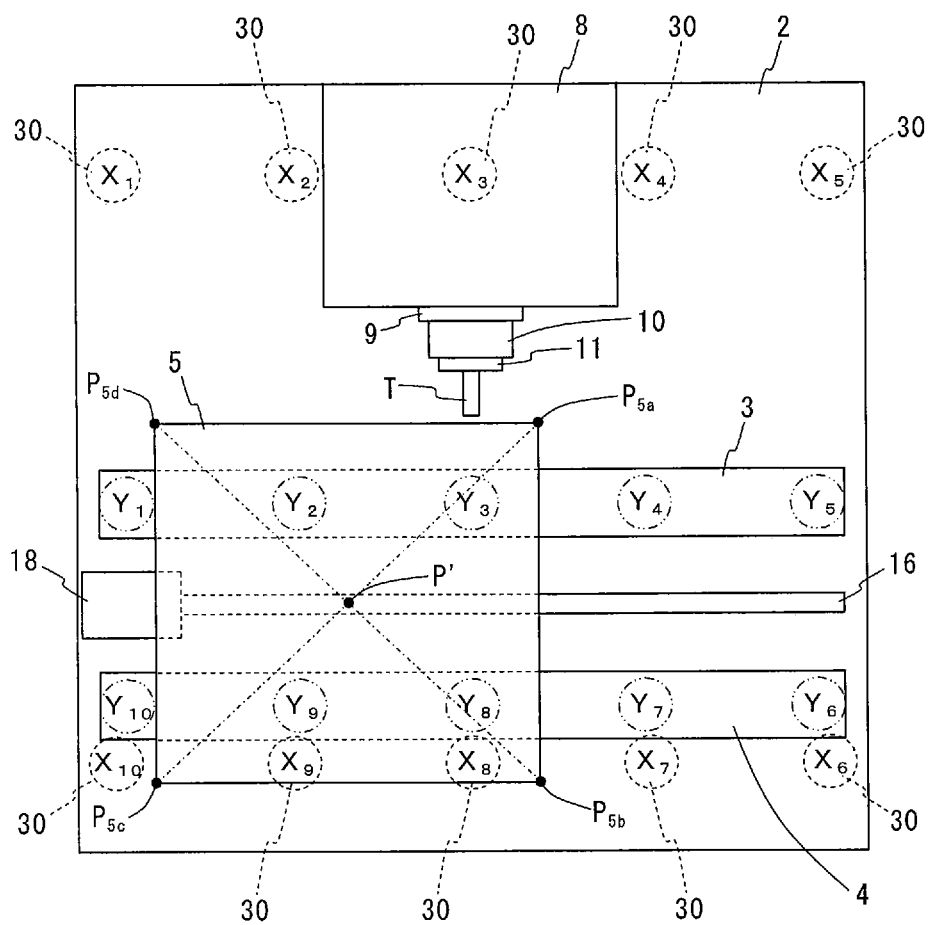
FIG. 10 is an illustration used for explaining a method of estimating a motion locus in the another embodiment of the present embodiment.

For example, the correction target point may be a center point P' calculated by, as shown in FIG. 10, regarding height positions or variation positions at the positions, of the positions $Y_1$ to $Y_{10}$, closest to the four corners of the top surface of the table 5 (points $P_{5a}$, $P_{5b}$, $P_{5c}$, and $P_{5d}$ in FIG. 10) as height positions or variation positions at the four points $P_{5a}$, $P_{5b}$, $P_{5c}$, and $P_{5d}$ (the closest position to the point $P_{5a}$ is $Y_3$, the closest position to the point $P_{5b}$ is $Y_8$, the closest position to the point $P_{5c}$ is $Y_{10}$, and the closest position to the point $P_{5d}$ is $Y_1$ in FIG. 10) and performing the CAE analysis or the like based on the coordinates of the four points $P_{5a}$, $P_{5b}$, $P_{5c}$, and $P_{5d}$. In this case, a line obtained by calculating height positions or variation positions of the center point P' at predetermined intervals in the moving direction of the table 5 and connecting the calculated positions can be estimated to be a motion locus. Note that the correction target point may be a center point P' calculated by regarding height positions or variation positions calculated by an interpolation calculation based on height positions or variation positions at the closet positions and the second closest positions to the four corners of the top surface of the table 5 (for example, $Y_3$ and $Y_4$ for the point $P_{5a}$ in FIG. 10) and the positions in the X-axis direction of the four corners of the top surface of the table 5 (for example, if the position of the point $P_{5a}$ in the X-axis direction is an intermediate position between $Y_3$ and $Y_4$, the height position or variation position of the point $P_{5a}$ is the average of $Y_3$ and $Y_4$) as height positions or variation positions at the four points $P_{5a}$, $P_{5b}$, $P_{5c}$, and $P_{5d}$, and similarly to the foregoing, performing the CAE analysis or the like based on the coordinates of the four points $P_{5a}$, $P_{5b}$, $P_{5c}$, and $P_{5d}$.

Further, in the above embodiment, when the motion error judgment part 52 judges that the maximum value of the received motion errors exceeds a reference value or that a variation value of the motion errors exceeds a reference value, and outputs an alarm signal, an operator is informed thereof by informing means, e.g., an operation panel or a warning lamp; however, the present disclosure is not limited thereto and machining of the workpiece W may be stopped without informing an operator.

What is claimed is:

1. A method of machining a workpiece with a machine tool supported by a plurality of supporting jigs having an adjusting mechanism for adjusting a vertical support position and a load cell detecting a support load, comprising:
   calculating height positions or variation positions relative to a reference height position at target positions set on guides in the machine tool based on the support loads detected by the load cells of the supporting jigs and an influence coefficient matrix defining degrees of influence of the support loads detected by the load cells upon the height positions at the target positions;
   estimating, based on the calculated height positions or variation positions at the target positions, a motion locus of relative motion of a tool attached to the machine tool and the workpiece along the guides;
   calculating motion errors between the estimated motion locus and a preset reference motion locus at predetermined intervals in a motion direction;
   correcting the relative motion of the tool and the workpiece based on the calculated motion errors so as to compensate for the motion errors, and then machining the workpiece; and
   emitting an alarm at least when a maximum value of the calculated motion errors exceeds a predetermined reference value or when a variation value of the motion errors in the motion direction exceeds a predetermined reference value.

2. The workpiece machining method using the machine tool according to claim 1, wherein:
   a matrix $A_{m,n}$ below is previously obtained as the influence coefficient matrix; and
   the height positions or variation positions at the target positions are calculated based on the matrix $A_{m,n}$ and the support loads detected by the load cells of the supporting jigs, $$A_{m,n} = \begin{pmatrix} a_{1,1} & a_{1,2} & \cdots & a_{1,n-1} & a_{1,n} \\ a_{2,1} & a_{2,2} & \cdots & a_{2,n-1} & a_{2,n} \\ \vdots & \vdots & \ddots & \vdots & \vdots \\ a_{m-1,1} & a_{m-1,2} & \cdots & a_{m-1,n-1} & a_{m-1,n} \\ a_{m,1} & a_{m,2} & \cdots & a_{m,n-1} & a_{m,n} \end{pmatrix},$$

where $a_{m,n}$ is a coefficient representing the degree of influence of the support load at the n-th supporting jig upon the height position at the m-th target position.

3. The workpiece machining method using the machine tool according to claim 2, wherein the height positions $S_m$ at the target positions are calculated in accordance with an equation below or the variation values at the target positions are calculated by subtracting the reference height position from the height positions $S_m$, $$S_m = A_{m,n} \times F_n,$$

where $F_n$ represents the support loads, $$S_m = \begin{pmatrix} s_1 \\ s_2 \\ \vdots \\ s_{m-1} \\ s_m \end{pmatrix}, \text{ and}$$

$$F_n = \begin{pmatrix} f_1 \\ f_2 \\ \vdots \\ f_{n-1} \\ f_n \end{pmatrix}.$$

4. A machine tool comprising:
a bed;
a plurality of supporting jigs having an adjusting mechanism for adjusting a vertical support position and a load cell detecting a support load, and supporting the bed at predetermined support positions;
a workpiece holder disposed on the bed for holding a workpiece;
a tool holder disposed on the bed for holding a tool;
a feed device moving the workpiece holder and the tool holder relative to each other along guides provided on the bed; and
a numerical controller generating a position control signal in accordance with a machining program for machining the workpiece into a target shape with the tool, and numerically controlling operation of the feed device in accordance with the generated position control signal,
the machine tool further comprising;
a motion locus estimator calculating height positions or variation positions relative to a reference height position at target positions set on the guides based on the support loads detected by the load cells of the supporting jigs and an influence coefficient matrix defining degrees of influence of the support loads detected by the load cells upon the height positions at the target positions, and estimating, based on the calculated height positions or variation positions at the target positions, a motion locus of relative motion of the tool and the workpiece moved along the guides by the feed device;
a motion error calculator calculating motion errors between the motion locus estimated by the motion locus estimator and a preset reference motion locus at predetermined intervals in a motion direction; and
a motion error judgment part outputting an alarm signal at least when a maximum value of the motion errors calculated by the motion error calculator exceeds a predetermined reference value or when a variation value of the motion errors in the motion direction exceeds a predetermined reference value, and
the numerical controller being configured to, when generating the position control signal, generate, based on the motion errors calculated by the motion error calculator, such a position control signal that the motion errors have been compensated for.

5. The machine tool according to claim 4, wherein the motion locus estimator calculates the height positions or variation positions at the target positions based on a previously obtained matrix $A_{m,n}$ below as the influence coefficient matrix as well as the support loads detected by the load cells of the supporting jigs, $$A_{m,n} = \begin{pmatrix} a_{1,1} & a_{1,2} & \cdots & a_{1,n-1} & a_{1,n} \\ a_{2,1} & a_{2,2} & \cdots & a_{2,n-1} & a_{2,n} \\ \vdots & \vdots & \ddots & \vdots & \vdots \\ a_{m-1,1} & a_{m-1,2} & \cdots & a_{m-1,n-1} & a_{m-1,n} \\ a_{m,1} & a_{m,2} & \cdots & a_{m,n-1} & a_{m,n} \end{pmatrix},$$

where $a_{m,n}$ is a coefficient representing the degree of influence of the support load at the n-th supporting jig upon the height position at the m-th target position.

6. The machine tool according to claim 5, wherein the motion locus estimator calculates the height positions $S_m$ at the target positions in accordance with an equation below or calculates the variation values at the target positions by subtracting the reference height position from the height positions $S_m$, $$S_m = A_{m,n} \times F_n,$$

where $F_n$ represents the support loads, $$S_m = \begin{pmatrix} s_1 \\ s_2 \\ \vdots \\ s_{m-1} \\ s_m \end{pmatrix}, \text{ and}$$

$$F_n = \begin{pmatrix} f_1 \\ f_2 \\ \vdots \\ f_{n-1} \\ f_n \end{pmatrix}.$$

7. A machine tool comprising:
a bed;
a plurality of supporting jigs having an adjusting mechanism for adjusting a vertical support position and a load cell detecting a support load, and supporting the bed at predetermined support positions;
a workpiece holder disposed on the bed for holding a workpiece;
a tool holder disposed on the bed or holding a tool;

a feed device moving the workpiece holder and the tool holder relative to each other along guides provided on the bed; and a numerical controller generating a position control signal in accordance with a machining program for machining the workpiece into a target shape with the tool, and numerically controlling operation of the feed device in accordance with the generated position control signal, the machine tool further comprising:

a motion locus estimator calculating height positions or variation positions relative to a reference height position at target positions set on the guides based on the support loads detected by the load cells of the supporting jigs and an influence coefficient matrix defining degrees of influence of the support loads detected by the load cells upon the height positions at the target positions, and estimating, based on the calculated height positions or variation positions at the target positions, a motion locus of relative motion of the tool and the workpiece moved along the guides by the feed device;

a motion error calculator calculating motion errors between the motion locus estimated by the motion locus estimator and a preset reference motion locus at predetermined intervals in a motion direction;

a motion error judgment part outputting an alarm signal at least when a maximum value of the motion errors calculated by the motion error calculator exceeds a predetermined reference value or when a variation value of the motion errors in the motion direction exceeds a predetermined reference value; and a position corrector successively receiving the position control signal generated by the numerical controller, generating a correction signal for the received position control signal based on the motion errors calculated by the motion error calculator, and adding the generated correction signal to the positon control signal in the numerical controller.

8. The machine tool according to claim 7, wherein the motion locus estimator calculates the height positions or variation positions at the target positions based on a previously obtained matrix $A_{m,n}$ below as the influence coefficient matrix as well as the support loads detected by the load cells of the supporting jigs $$A_{m,n} = \begin{pmatrix} a_{1,1} & a_{1,2} & \cdots & a_{1,n-1} & a_{1,n} \\ a_{2,1} & a_{2,2} & \cdots & a_{2,n-1} & a_{2,n} \\ \vdots & \vdots & \ddots & \vdots & \vdots \\ a_{m-1,1} & a_{m-1,2} & \cdots & a_{m-1,n-1} & a_{m-1,n} \\ a_{m,1} & a_{m,2} & \cdots & a_{m,n-1} & a_{m,n} \end{pmatrix},$$

where $a_{m,n}$ is a coefficient representing the degree of influence of the support load at the n-th supporting jig upon the height position at the m-th target position.

9. The machine tool according to claim 8, wherein the motion locus estimator calculates the height positions $S_m$ at the target positions in accordance with an equation below or calculates the variation values at the target positions by subtracting the reference height position from the height positions $S_m$, $$S_m = A_{m,n} \times F_n,$$

where $F_n$ represents the support loads, $$S_m = \begin{pmatrix} s_1 \\ s_2 \\ \vdots \\ s_{m-1} \\ s_m \end{pmatrix}, \text{ and}$$

$$F_n = \begin{pmatrix} f_1 \\ f_2 \\ \vdots \\ f_{n-1} \\ f_n \end{pmatrix}.$$

* * * * *